United States Patent [19]
Sakoske et al.

[11] Patent Number: 5,968,659
[45] Date of Patent: *Oct. 19, 1999

[54] PARTIALLY CRYSTALLIZING CERAMIC ENAMEL COMPOSITION CONTAINING BISMUTH SILICATE, AND USE THEREOF

[75] Inventors: George E. Sakoske, Mayfield Heights, Ohio; Joseph W. Ryan, Washington, Pa.

[73] Assignee: Cerdec Corporation, Washington, Pa.

[*] Notice: This patent is subject to a terminal disclaimer.

[21] Appl. No.: 08/964,267

[22] Filed: Nov. 4, 1997

Related U.S. Application Data

[62] Division of application No. 08/569,905, Dec. 8, 1995, Pat. No. 5,714,420.

[51] Int. Cl.$^6$ ........................................... B32B 17/00
[52] U.S. Cl. ........................ 428/428; 428/432; 428/701
[58] Field of Search .................................. 428/428, 432, 428/701, 702

[56] References Cited

U.S. PATENT DOCUMENTS

| | | |
|---|---|---|
| 4,029,605 | 6/1977 | Kosiorek . |
| 4,098,949 | 7/1978 | Kosiorek . |
| 4,596,590 | 6/1986 | Boaz . |
| 4,684,389 | 8/1987 | Boaz . |
| 4,770,685 | 9/1988 | Boaz . |
| 4,822,396 | 4/1989 | Reinherz et al. . |
| 4,828,596 | 5/1989 | Reinherz . |
| 4,837,383 | 6/1989 | Andrews . |
| 4,857,096 | 8/1989 | Boaz . |
| 4,892,847 | 1/1990 | Reinherz . |
| 4,959,090 | 9/1990 | Reinherz . |
| 4,970,178 | 11/1990 | Klimas et al. . |
| 4,983,196 | 1/1991 | Stotka . |
| 5,037,783 | 8/1991 | Boaz . |
| 5,093,285 | 3/1992 | Murkens . |
| 5,153,150 | 10/1992 | Ruderer et al. . |
| 5,203,902 | 4/1993 | Murkens . |
| 5,208,191 | 5/1993 | Ruderer et al. . |
| 5,286,270 | 2/1994 | Ruderer et al. . |
| 5,346,651 | 9/1994 | Oprosky et al. . |
| 5,578,533 | 11/1996 | Manabe et al. ........................... 501/17 |
| 5,714,420 | 2/1998 | Sakoske ..................................... 501/14 |

FOREIGN PATENT DOCUMENTS

| | | |
|---|---|---|
| 201 241 | 12/1986 | European Pat. Off. . |
| 370 683 | 5/1990 | European Pat. Off. . |
| 6-234547 | 8/1994 | Japan . |
| 7-144933 | 6/1995 | Japan . |

*Primary Examiner*—Timothy Speer
*Attorney, Agent, or Firm*—Wenderoth, Lind & Ponack, L.L.P.

[57] ABSTRACT

A ceramic enamel composition consists of an oxide frit, a bismuth silicate seed material, a pigment, and a vehicle. A preferred bismuth silicate seed material is selected from crystalline $Bi_{12}SiO_{20}$, $Bi_4(SiO_4)_3$, and $Bi_2SiO_5$, and mixtures thereof. Upon firing a glass substrate coated with the enamel, components of the enamel adhere to the substrate. The glass can be formed with a die to a desired shape with reduced sticking of the coated region to the die. The ceramic enamel is particularly useful in providing a colored border around automotive glass, which enhances appearance and reduces degradation of adhesives by ultraviolet radiation.

7 Claims, No Drawings

PARTIALLY CRYSTALLIZING CERAMIC ENAMEL COMPOSITION CONTAINING BISMUTH SILICATE, AND USE THEREOF

This application is a division of application Ser. No. 08/569,905, filed Dec. 8, 1995 now U.S. Pat. No. 5,714,420.

FIELD OF THE INVENTION

The present invention relates to ceramic enamels, particularly for use with automotive glass.

BACKGROUND OF THE INVENTION

Ceramic enamel paint compositions are well known in the art. They can be used for a variety of applications as, for example, decorative coatings for glassware, chinaware, and the like. They are especially useful in forming colored borders around glass sheets used for automotive windshields, sidelights and backlights. The colored borders enhance appearance as well as prevent UV degradation of underlying adhesives.

In general, these enamel compositions consist mainly of a glass frit, a colorant and an organic vehicle. They are applied to a substrate and subsequently fired to burn off the organic vehicle and fuse the frit thus bonding the enamel coating to the substrate.

Glass sheets for automotive use are generally coated with the ceramic enamel composition and then subjected to a forming process at elevated temperatures. During this treatment the enamel melts and fuses to the glass substrate and the glass is formed into a desired final shape. However, many prior art coatings exhibit a tendency to adhere to the materials covering the forming die, such as a fiberglass or metal fiber covered die, because these conventional enamels have a low viscosity after melting and stick to other materials at high temperature. Accordingly, these materials are not suitable for use in glass forming processes in which the heated glass coated with enamel contacts a material-covered forming die.

Various approaches have been suggested in order to facilitate the forming of glass sheets with a ceramic enamel coated thereon, withstanding of the elevated bending or forming temperatures, and repeated contact of the glass sheet and the covered forming die without the enamel adhering to the forming die. For example, U.S. Pat. Nos. 4,596,590 and 4,770,685 (issued to Boaz) and EP 201241 propose the addition of a low valent metal oxide powder, e.g., cuprous oxide, to the paint composition to provide a non-stick barrier between the coating and the fiberglass-covered forming die. U.S. Pat. Nos. 4,684,389; 4,857,096 and 5,037,783 (issued to Boaz), propose adding finely divided zinc metal powder for a similar effect. The use of an iron metal powder is proposed in U.S. Pat. No. 4,983,196 (issued to Stotka).

The use of other metal oxide powders, including bismuth oxide-containing formulations have been proposed in U.S. Pat. Nos. 4,029,605 (issued to Kosiorek); 4,098,949 (issued to Kosiorek); 4,892,847 (issued to Reinherz); 4,959,090 (issued to Reinherz); 4,970,178 (issued to Klimas et al.); 5,093,285 (issued to Murkens); 5,203,902 (issued to Murkens) and EP 370,693.

However, certain of the bismuth containing systems produce a weak glass, such as when lithium is present, and have poor silver bleed-through properties, as well as inadequate anti-stick properties.

U.S. Pat. No. 4,828,596 proposes introducing copper sulfide or copper sulfate into the ceramic enamel composition as an anti-stick agent. Sulfides or sulfates of other metals have been proposed as anti-stick agents in U.S. Pat. No. 4,822,396 (issued to Reinherz et al.).

A purportedly improved anti-stick ceramic enamel composition is proposed by U.S. Pat. Nos. 5,153,150 and 5,208,191 (issued to Ruderer et al.) wherein a seed powder containing $Zn_2SiO_4$ is introduced into an oxide composition with or without the presence of bismuth oxide.

As a further problem, a number of previous ceramic enamel systems employ a lead-containing glass frit. For environmental considerations it is desirable to avoid the use of any lead-containing system.

Also, while some of the above-mentioned enamel systems may perform fairly well in conventional glass forming processes, some are not satisfactory for use in the newly-developed "deep bend" processes for forming automotive glass.

It is essential that the enamel compositions also possess adequate resistance to certain chemical agents, which they may contact, and many of the prior art compositions fail in this respect.

Each of the previously known enamel compositions suffers from one or more of the deficiencies noted above, making it desirable to provide a composition which avoids these shortcomings. The present invention provides such ceramic enamel compositions, a method for employing the compositions, and substrates coated therewith.

SUMMARY OF THE INVENTION

The present invention is for a ceramic enamel composition that forms an at least partially crystalline bismuth silicate material on a glass substrate upon fusing at high temperature.

A ceramic enamel composition of the invention comprises 20–80% by weight of an oxide frit, 0.5–60% by weight of a bismuth silicate seed material, 10–40% by weight of a pigment, and 10–40% by weight of a vehicle. The bismuth silicate seed material is preferably provided as seed crystals in the composition and may be further generated from bismuth oxide and silicon dioxide in the composition, e.g., as provided by the oxide frit, upon firing the composition, particularly when the seed material provides nuclei for further crystal growth.

A method of preparing an instant ceramic enamel composition comprises combining in no particular order the aforementioned components in the desired amounts.

The invention is also for a method of using the aforesaid ceramic enamel with automotive glass, so as to form a colored border and/or UV resistant border around the periphery of the automotive glass. Thus, a glass substrate is provided with a ceramic enamel coating by applying an aforementioned ceramic enamel composition to the glass substrates and firing the coated glass substrate to fuse components of the ceramic enamel composition to the glass substrate.

Accordingly, a glass substrate having a ceramic enamel coating adherent thereto is contemplated in which the ceramic enamel coating is composed at least in part of a crystalline bismuth silicate material. Preferably, the coating is provided on at least a portion of the periphery of the glass substrate.

Furthermore, a method of forming a glass substrate provided with an instant coating is described, which comprises (a) applying an aforementioned ceramic enamel composition to a glass substrate; (b) heating the coated glass to an elevated temperature, preferably at least 1200° F.; (c) subjecting the heated glass to a conventional forming pressure, e.g., in the range of 1 to 3 psi, typically about 2 psi, with a forming die; and (d) separating the formed glass from the die.

Among the advantages of the present invention are its excellent anti-stick properties, good consistency, chemical durability, broad temperature firing range, and low stress.

The invention will now be described in more detail and with reference to examples.

DETAILED DESCRIPTION OF THE INVENTION

The present invention provides a ceramic enamel composition that contains at least one bismuth silicate seed material as a component. An instant bismuth silicate seed material is described more fully hereinbelow.

A composition of the invention contains the following components: (1) at least one conventional oxide glass frit; (2) a bismuth silicate seed material; (3) a colorant (pigment); and (4) a vehicle for components (1)–(3). The bismuth silicate seed material is believed to assist in nucleating and growing microcrystalline structures, e.g., crystalline bismuth silicate compounds, in the composition upon firing.

Typically, an instant ceramic enamel composition comprises 20–80% by weight of an oxide frit, 0.5–60% by weight of a bismuth silicate seed material, 10–40% by weight of a pigment, and 10–40% by weight of a vehicle. More preferably, a bismuth silicate seed material is provided in an amount of 2–40% by weight, and an oxide frit is provided in an amount of 40–80% by weight.

As referred to herein, the terms crystal, crystalline, microcrystalline, and the like, mean that the subject material is sufficiently crystalline (ordered) to reveal one or more discrete phase(s) by X-ray diffraction techniques.

While not wishing to be bound by theory, it is believed that the presence of the bismuth silicate seed material causes nucleation and growth of crystals leading to increased refractoriness and devitrification. Devitrification involves the separation of microcrystalline structures, such as $Bi_{12}SiO_{20}$, $Bi_2(SiO_3)_4$, and the like, in the fused enamel. The presence of these microcrystalline structures in the fused enamel is believed to greatly reduce the tendency of the enamel to stick to surfaces, e.g., pressing pads, during the shaping of the glass substrate at elevated temperature.

In respect to the glass frit employed in this invention, it is not excluded to employ a single bismuth oxide and silicon dioxide frit, or a noncrystalline bismuth silicate material, which is formulated to generate in situ upon heating the requisite microcrystalline structures. A blend of two or more conventional glass frits can also employed in order to obtain a composition having the desired properties.

Preferably, however, a crystalline bismuth silicate seed material is provided in the enamel composition. The crystalline bismuth silicate seed material can be provided in the composition at high levels, e.g., 60% or higher, of the solids present in the composition. However, at least some oxide frit is desirable in the composition in order to provide a flux.

Preferred bismuth silicate seed materials for this type of reactive system can include, but are not limited by, the compounds $Bi_{12}SiO_{20}$, $Bi_4(SiO_4)_3$, $Bi_2SiO_5$, and mixtures thereof. Any one or all of these compounds are preferably crystalline and may be present as a mixture within the same crystalline material.

A crystalline bismuth silicate material suitable for use in the present invention can be prepared according to any of a number of well known methods. For instance, $Bi_{12}SiO_{20}$ (CAS Registry No. 12377-72-9) can be prepared by heating bismuth oxide and silicon dioxide in a 6:1 molar ratio at up to 840° C. for 16 hours [National Bureau of Standards, Monogr., 25:22 (1985)]. $Bi_4(SiO_4)_3$ (CAS Registry No. 15983-20-7) can be prepared by firing a 2:3 ratio of bismuth oxide and silica at 780° C. for 50 hours, regrinding, and firing at 830° C. for 18 hours [Roob, et al., North Dakota State Univ., JCPDS Grant-in-Aid Report (1980)]. $Bi_2SiO_5$ (CAS Registry No. 12027-75-7) can be prepared by melting a 1:1 ratio of bismuth oxide and silicon dioxide at 1000–1040° C., quenching in water, and crystallizing at 400–520° C. for one week [Keller, et al., Mineralogisch-Petrographisches Institut, Univ. Heidelberg, Germany, JCPDS Grant-in-Aid Report (1984)]. Other methods of preparing these and related materials are readily apparent to the skilled practitioner.

The particle size for an instant bismuth silicate seed material is preferably in the range of 1 to 4 microns, more preferably about 1.8 microns.

Additional crystalline materials, such as alumina-silicate compounds, calcium silicate compounds, boro-alumina-silicate compounds, soda-calcia-alumina-silicate compounds, feldspar compounds, titania, and mixtures thereof, can also be included in the formulation. Still further metallic and/or oxide materials can be added, especially when their presence promotes the nucleation and growth of the requisite bismuth silicate microcrystalline structures.

As presently preferred, an enamel composition of the invention contains a base glass frit which is at least one conventional bismuth and/or zinc based frit, such as are commercially available from Cerdec Corporation (Washington, Pa.). Such frits can be employed alone or can be blended to achieve the desired properties. In general, these frits are lead-free because of the above-mentioned environmental considerations although the employment of lead-containing frits is not excluded where conditions permit. Certain bismuth and zinc based frits are well known in the art.

A representative frit that can be used in the present invention has a composition shown in Table 1 below.

TABLE 1

| Oxide | Weight % Range |
|---|---|
| $SiO_2$ | 20–35 |
| $Bi_2O_3$ | 10–50 |
| ZnO | 5–45 |
| $B_2O_3$ | 5–15 |
| $Na_2O$ | 1–7 |
| CaO | 0–10 |
| $TiO_2$ | 0–2 |
| $Al_2O_3$ | 0–5 |
| $ZrO_2$ | 0–2 |
| $F_2$ | 0–1 |

A method of making such a frit is disclosed in U.S. Pat. No. 5,346,651 (issued to Oprosky et al.). The frits have a sufficiently low firing temperature to ensure adequate adhesion to the substrate and also possess low density characteristics.

A particularly suitable bismuth containing frit composition is commercially available from Cerdec Corporation as RD-2006.

Suitable zinc containing frits are commercially available from Cerdec Corporation as E-8012 and PD997.

The pigment of a ceramic enamel of the invention can be any of those which are commercially available. Particularly preferred pigments are commercially available from Cerdec Corporation as *2991 pigment, which is a copper chromite black pigment, *2980 pigment, which is a cobalt chromium iron black pigment, and *2987 pigment, which is a nickel manganese iron chromium black pigment.

The vehicle to be employed in the compositions is selected on the basis of its end use application. It is essential that the vehicle adequately suspend the particulates and burn off completely upon firing of the composition on the substrate. Vehicles are typically organic and include compositions based on pine oils, vegetable oils, mineral oils, low molecular weight petroleum fractions, tridecyl alcohol, synthetic and natural resins, and the like.

Correspondingly, UV-base vehicles are equally applicable for use in the invention. Such UV-base vehicles are well known in the art and are generally composed of polymerizable monomers and/or oligomers containing, for example, acrylate or methacrylate functional groups, together with photoinitiators and polymerization inhibitors. Representative systems are disclosed in U.S. Pat. Nos. 4,306,012 and 4,649,062. As is recognized, such systems are cured with ultraviolet radiation after application to the substrate.

The specific vehicle and amounts employed are selected based upon the specific components of the composition and the desired viscosity. In general, the amount of the vehicle is about 10 to about 40% by weight based upon the total weight of the enamel composition.

In general, the enamel compositions are viscous in nature, with the viscosity depending upon the application method to be employed and end use. For purposes of screen-printing, viscosities ranging from 10,000 to 80,000 and preferably 35,000 to 65,000, centipoises at 20° C., as determined on a Brookfield Viscometer, #7 spindle at 20 rpm, are appropriate.

An enamel of the invention may also contain commonly used fillers, such as silica and alumina, and other conventional additives, such as iron, silicon, zinc, and the like, to enhance desired properties, such as resistance to silver bleed-through.

To prepare an enamel composition of the invention, a frit is ground to a fine powder using conventional methods and is combined in any order with an aforementioned bismuth silicate seed material, a pigment, any fillers, and a vehicle. When the bismuth silicate seed material of the composition is desired to be crystalline, it is also added. Other oxides, as discussed above, can be added, as well as materials which resist silver bleed-through. More than one representative of each of the different types of components mentioned above can be provided in the enamel composition.

Once the enamel composition is prepared it can be applied to a glass substrate in a conventional manner, such as by screen printing, decal application, spraying, brushing, roller coating, and the like. Screen printing is preferred when the composition is applied to glass substrates. After application of the composition to a substrate in a desired pattern, the applied coating is then fired to bond the enamel to the substrate. The firing temperature is generally determined by the frit maturing temperature, and preferably is in a broad temperature range. Typically, the firing range for an instant composition is in the range of 1100–1350° F., more preferably in the range of 1200–1300° F., and most preferably about 1250° F.

The following compositions represent preferred embodiments of the invention. They are presented to explain the invention in more detail, and do not limit the invention.

EXAMPLE 1

A composition consisting of the following components was prepared. The indicated weight percentages were calculated on the basis of a printing medium being excluded from the composition.

| Component | Weight % |
| --- | --- |
| RD2006[1] | 37.5 |
| PD997[2] | 25.0 |
| Bismuth Silicate seed[3] | 17.5 |
| *2991 pigment[4] | 20.0 |

[1]RD2006 is a bismuth frit commercially available from Cerdec Corporation.
[2]PD997 is a zinc frit commercially available from Cerdec Corporation.
[3]Bismuth silicate seed crystals were prepared by reacting bismuth oxide and silica as described, with X-ray diffraction analysis indicating the presence of the following phases: 57% $Bi_{12}SiO_{20}$, 33% $Bi_4[SiO_4]_3$, and 10% $Bi_2SiO_5$.
[4]*2991 pigment is commercially available from Cerdec Corporation.

EXAMPLE 2

An enamel composition was prepared according to Example 1 having the weight percentages indicated below. The bismuth silicate seed crystals and other components were the same as described in Example 1.

| Component | Weight % |
| --- | --- |
| RD2006 | 44.2 |
| PD997 | 17.8 |
| Bismuth Silicate seed | 17.5 |
| *2991 pigment | 20.5 |

EXAMPLE 3

An enamel composition was prepared according to Example 1 having the weight percentages indicated below. The bismuth silicate seed crystals and other components were the same as described in Example 1.

| Component | Weight % |
| --- | --- |
| RD2006 | 63 |
| Bismuth Silicate seed | 10 |
| *2991 pigment | 27 |

EXAMPLE 4

The following enamel represents a typical composition used for screen printing onto a glass substrate to be press formed.

| Ingredient | Weight % |
| --- | --- |
| Glass frit | 49 |
| Crystal seed powder | 11 |
| Pigment | 20 |
| Printing medium | 20 |

The present invention has been described by way of illustration and example, and is not limited by the particular embodiments set forth above. Therefore, it should be appreciated by one skilled in the art that certain obvious modifications equivalent to the present invention can be practiced within the scope of the appended claims.

What is claimed is:

1. A glass substrate having a ceramic enamel coating adherent thereto, said coating being obtained by applying to at least a portion of a glass substrate a ceramic enamel composition comprising 20 to 80% by weight of an oxide frit, 0.5 to 60% by weight of a crystalline bismuth silicate seed material, 10 to 40% by weight of a pigment and 10 to 40% by weight of an organic vehicle and heating the coated glass substrate to an elevated temperature to fuse components of the ceramic enamel composition to the glass substrate.

2. A glass substrate according to claim 1 wherein the glass substrate is automotive glass.

3. A glass substrate according to claim 2 wherein the enamel composition is applied to the periphery of the glass substrate.

4. A glass substrate according to claim 1 wherein, in the ceramic enamel composition, the oxide frit contains at least one member selected from the group consisting of bismuth oxide and zinc oxide.

5. A glass substrate according to claim 1 wherein, in the ceramic enamel composition, the crystalline bismuth silicate seed material contains at least one phase selected from the group consisting of $Bi_{12}SiO_{20}$, $Bi_4(SiO_4)_3$ and $Bi_2SiO_5$.

6. A glass substrate according to claim 1 wherein the ceramic enamel composition further contains a material selected from the group consisting of alumina-silicate compounds, calcium silicate compounds, boro-alumina-silicate compounds, soda-calcia-alumina-silicate compounds, feldspar compounds, titania, and mixtures thereof.

7. A glass substrate according to claim 1 wherein the ceramic enamel composition further comprises a silver bleed-through resistant material containing iron, silicon or zinc.

* * * * *